Patented Feb. 25, 1947

2,416,658

UNITED STATES PATENT OFFICE 2,416,658

PREPARATION OF 6-METHOXYQUINOLINE-N-OXIDE

Arthur M. Van Arendonk, Indianapolis, Ind., assignor to Eli Lilly and Company, Indianapolis, Ind., a corporation of Indiana No Drawing. Application October 19, 1944,
Serial No. 559,486

5 Claims. (Cl. 260—289)

This invention relates to an improved process of preparing 6-methoxyquinoline-N-oxide from 6-methoxyquinoline.

6-methoxyquinoline-N-oxide is an intermediate in the preparation of 4-substituted-amino-6-methoxyquinolines, which have therapeutic qualities as anti-malarials.

6-methoxyquinoline-N-oxide previously has been prepared by reacting 6-methoxyquinoline with perbenzoic acid in ether or other solution to form the benzoic acid salt of 6-methoxyquinoline-N-oxide, and subsequently liberating the free base from the salt. In a similar procedure, perphthalic acid has been employed in place of the perbenzoic acid. These methods are disadvantageous in that perbenzoic acid and perphthalic acid are seldom if ever available commercially. Furthermore, since the product of reaction with either perbenzoic acid or perphthalic acid is a salt, there is involved the additional procedure of liberating the free 6-methoxyquinoline-N-oxide from the salt. Additionally, it has been necessary to employ large volumes of ether or other solvent in order to carry out the reaction satisfactorily, with the attendant disadvantages.

An object of this invention is to provide a method of preparing 6-methoxyquinoline-N-oxide which is free from the disadvantages outlined hereinabove.

In pursuance of the above and other objects, I have provided by this invention a simple and efficient method of preparing 6-methoxyquinoline-N-oxide by reacting 6-methoxy-quinoline with hydrogen peroxide in association with a lower aliphatic acid in which both reactants are soluble.

In carrying out this invention in a preferred manner, 6-methoxyquinoline is dissolved in a lower aliphatic acid in which both 6-methoxyquinoline and hydrogen peroxide are soluble, for example concentrated acetic acid. An aqueous solution of hydrogen peroxide is also provided. The 6-methoxyquinoline and hydrogen peroxide solutions are mixed and the mixture permitted to stand until the reaction is completed with the formation of 6-methoxyquinoline-N-oxide. The isolation of the 6-methoxyquinoline-N-oxide from the reaction mixture may be accomplished by concentrating the liquid mixture by evaporation or distillation, and then partially neutralizing it, for example to a pH of 5 or 6, preferably with cooling for maximum yield, whereupon the 6-methoxyquinoline-N-oxide percipitates from the solution as a solid. The product thus obtained is substantially pure and comprises 6-methoxyquinoline-N-oxide dihydrate which upon brief drying in a vacuum or extended exposure to the atmosphere loses water to form 6-methoxyquinoline-N-oxide.

The group of lower aliphatic acids suitable for the practice of this invention consists of acetic, propionic, butyric, and isobutyric acids. The members of this group of acids are peculiarly advantageous because they dissolve both 6-methoxyquinoline and hydrogen peroxide and they provide a favorable hydrogen ion concentration for effecting the reaction between 6-methoxyquinoline and hydrogen peroxide. Of this group glacial acetic acid is especially convenient because of its availability and low cost.

The reaction between the 6-methoxyquinoline and hydrogen peroxide in acid solution may be permitted to take place at room temperature over an extended period. However, the reaction takes place more rapidly at somewhat elevated temperatures. For example, at 50° C. the reaction takes place in about 12 hours or less. Following the completion of the reaction the 6-methoxyquinoline-N-oxide may be isolated by neutralizing the solution to a point at which the oxide is substantially insoluble. The precipitation of the oxide may be accelerated and made more complete by chilling the solution to a temperature below about 10° C. in any suitable manner, for example by incorporating ice therein.

Under the conditions herein outlined, the 6-methoxyquinoline-N-oxide is obtained directly as such rather than as a salt. Consequently there is eliminated any necessity for the recovery of the oxide from its salt as is necessary with the processes of the prior art.

The process of this invention is not only simple, but the yield of product is also high, being in the neighborhood of about 90 percent.

A specific example of the practice of this invention is as follows:

To 100 g. of 6-methoxyquinoline dissolved in 700 cc. of glacial acetic acid at room temperature, was added, with shaking, 100 cc. of a 30 percent aqueous solution of hydrogen peroxide. The resulting mixture was maintained at a temperature of about 50° C. for 12 hours and distilled, under 50 mm. pressure, to slightly less than one-half of the original volume. 200 grams of ice and 75 cc. of a 40 percent aqueous solution of sodium hydroxide were then added to the residual solution with stirring, whereupon the desired 6-methoxyquinoline-N-oxide precipitated in the form of a finely divided crystalline solid, which was filtered off and dried in vacuo. The dried 6-methoxyquinoline-N-oxide melted at 186–187° C. The yield was about 90 percent.

I claim as my invention:

1. The method of preparing 6-methoxyquinoline-N-oxide which comprises reacting 6-methoxyquinoline, dissolved in a solvent selected from the group of lower aliphatic acids consisting of acetic, propionic, butyric and isobutyric acids, with hydrogen peroxide.

2. The method of preparing 6-methoxyquinoline-N-oxide which comprises reacting 6-methoxyquinoline, dissolved in a solvent of a group of lower aliphatic acids consisting of acetic, propionic, butyric, and isobutyric acids, with hydrogen peroxide in aqueous solution, and recovering the 6-methoxyquinoline-N-oxide from said reaction mixture.

3. The method of preparing 6-methoxyquinoline-N-oxide which comprises reacting 6-methoxyquinoline dissolved in glacial acetic acid with hydrogen peroxide in aqueous solution, and adding alkali to precipitate the 6-methoxyquinoline-N-oxide.

4. The method of preparing 6-methoxyquinoline-N-oxide which comprises reacting 6-methoxyquinoline in glacial acetic acid solution with hydrogen peroxide in approximately 30 percent aqueous solution, and precipitating the 6-methoxyquinoline-N-oxide by the addition of alkali while maintaining the reaction mixture in a liquid state at a temperature below about 10° C.

5. The method of preparing 6-methoxyquinoline-N-oxide which comprises reacting 6-methoxyquinoline in glacial acetic acid solution with hydrogen peroxide in approximately 30 percent aqueous solution, at a temperature elevated above room temperature, removing the major portion of the solvent, and precipitating the 6-methoxyquinoline-N-oxide from the residual solution by the addition of ice and alkali.

ARTHUR M. VAN ARENDONK.

REFERENCES CITED

The following references are of record in the file of this patent:

UNITED STATES PATENTS

| Number | Name | Date |
|---|---|---|
| 2,169,976 | Guenther et al. | Aug. 15, 1939 |

OTHER REFERENCES (1) Berichte, vol. 59–B, pages 1848–53 (1926).
(2) Berichte, vol. 71, page 578 (1938).
(3) J. Organic Chem., July 1944, pages 302, 303, 307.
(4) J. Gen. Chem. (U. S. S. R.), vol. 7, page 1896 (1937).